Nov. 17, 1953
C. C. PETERSEN
2,659,400
GUARD FOR SAWS
Filed Dec. 19, 1947
3 Sheets-Sheet 1
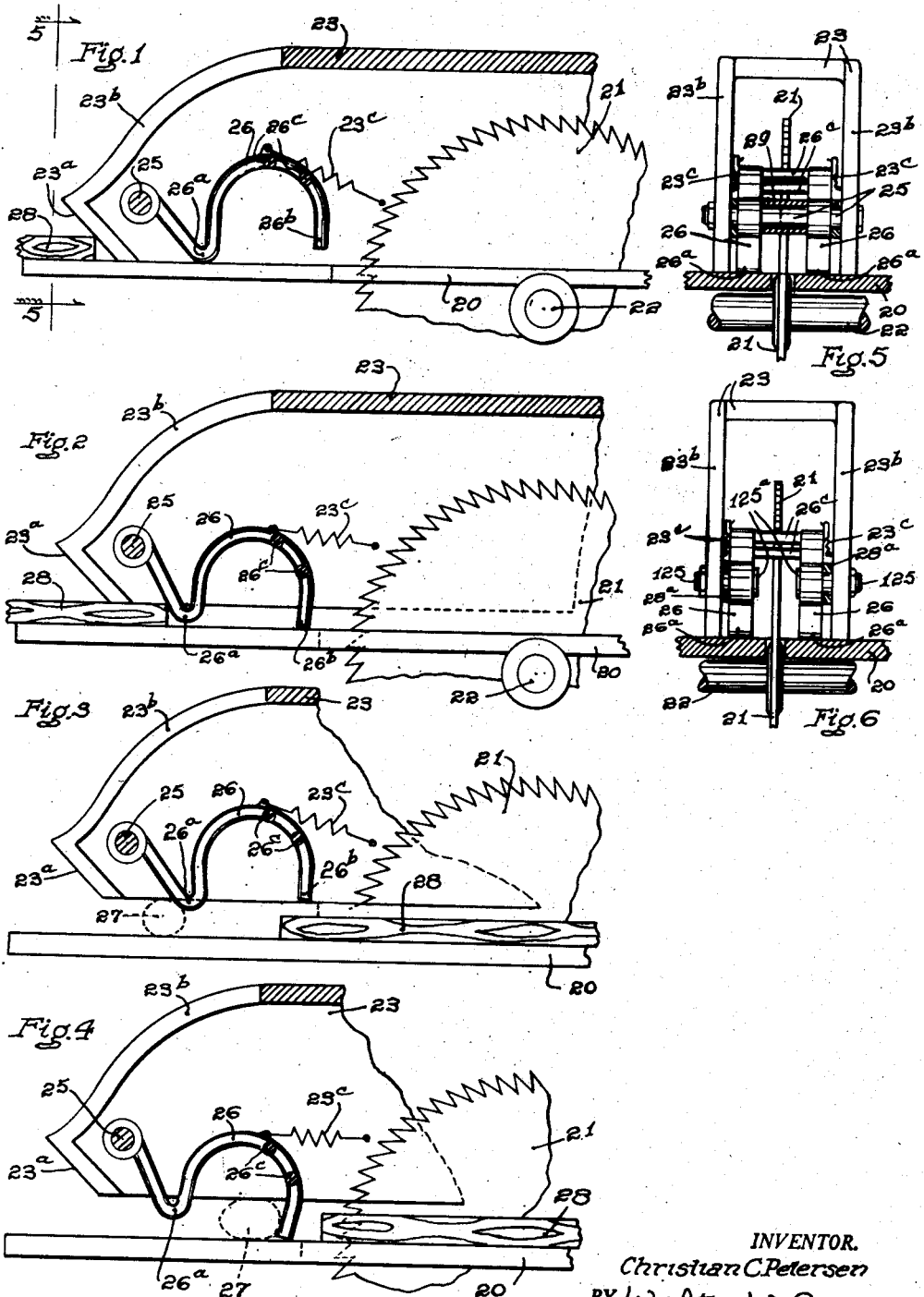
INVENTOR.
Christian C. Petersen
BY Walter W. Burns
Attorney Nov. 17, 1953
C. C. PETERSEN
2,659,400
GUARD FOR SAWS
Filed Dec. 19, 1947
3 Sheets-Sheet 2
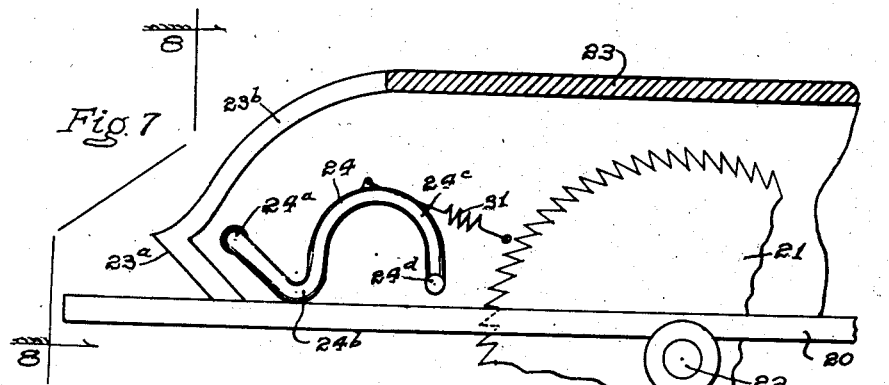
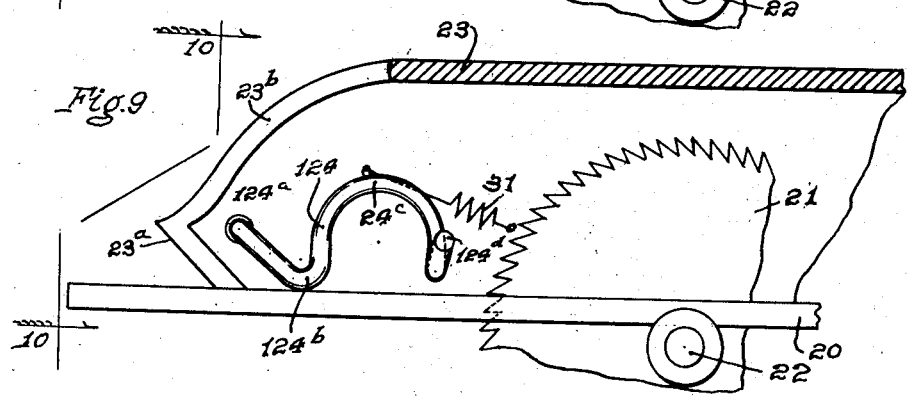
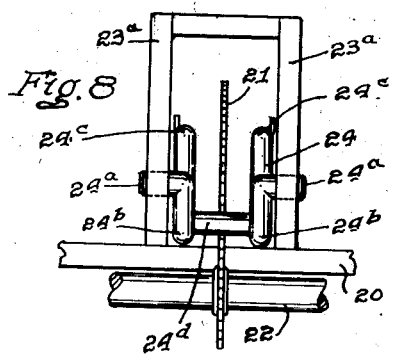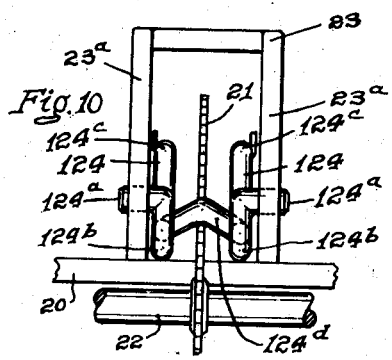
INVENTOR.
Christian C. Petersen
BY Walter W. Burns
Attorney Nov. 17, 1953   C. C. PETERSEN   2,659,400
GUARD FOR SAWS
Filed Dec. 19, 1947   3 Sheets-Sheet 3
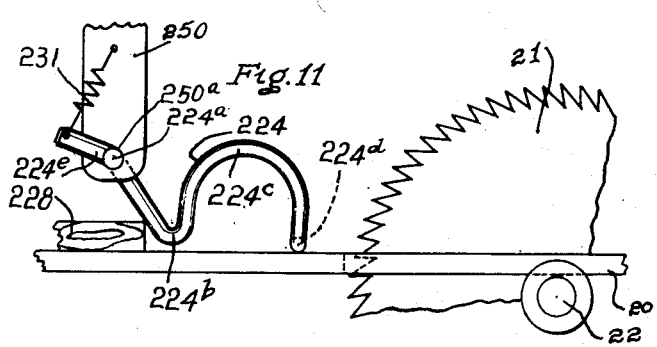
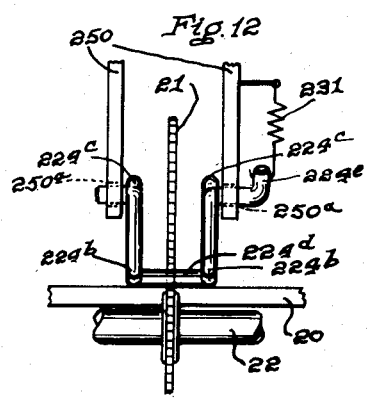
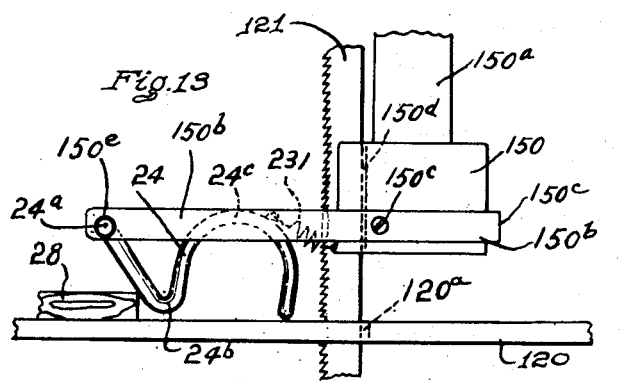
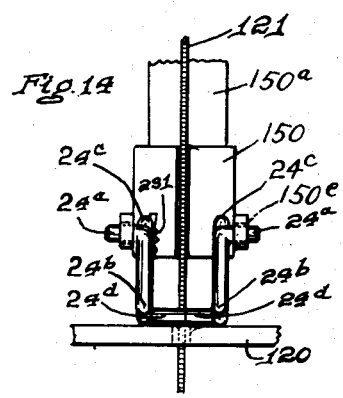
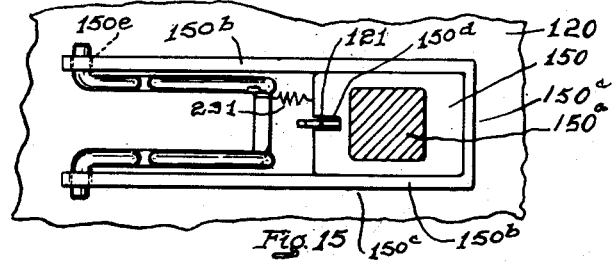
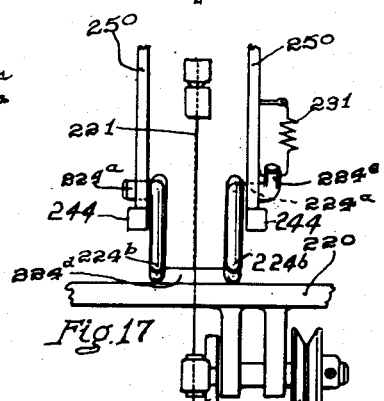
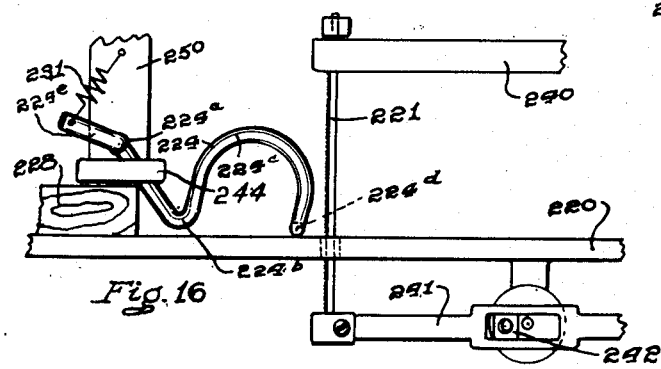
INVENTOR.
Christian C. Petersen
BY Walter W. Burns
Attorney Patented Nov. 17, 1953

2,659,400

UNITED STATES PATENT OFFICE 2,659,400

GUARD FOR SAWS

Christian C. Petersen, Brooklyn, N. Y.; Grace Petersen, administratrix, assignor to Grace Petersen Application December 19, 1947, Serial No. 792,741

5 Claims. (Cl. 143—159)

This invention relates to saw guards and has particular relation to a type of guard wherein a special protection is provided for the protection of the hand of the operative and wherein the working point of the saw is visible.

In the operation of saws and particularly circular saws there is a tendency of the operative to force the piece of work underneath the guard with one of his hands, to a point where some portion of the hand may come into contact with the saw with the result that a serious accident may occur. The likelihood of an accident is increased where the wood or other material of which the work is made, is of variable density, causing the resistance to the forward movement to be varied and in turn vary the speed. In addition, the point of action of the saw is usually out of sight, being behind some portion of the guard. This increases the likelihood of an accident.

The primary object of this invention is the provision of an improved guard for a saw.

Another object of the invention is the provision of a saw guard, wherein on approach to a saw blade, the finger of the operative nearest the point of action of the saw will encounter a plurality of projections which will warn the operative, impede the movement of the finger of the operative, and at the same time will be so placed that the operative may see the point of action of the saw to permit observance of the accuracy of the action.

A further object of the invention is the provision of a saw guard wherein, with the point of action of the saw in sight, there will be a first contact of a finger or other part of the operative's hand with a portion of a guard means to warn of danger and if this is not effective, a further stop means will arrest the movement, of the finger or other portion of the hand, toward the point of action of the saw.

A still further object of the invention is the provision of a saw guard which has a pivoted action with relation to an outer protective saw guard which will permit of a view by the operative of the point of action of the saw and have portions spaced from each other, yet close enough to provide an interference to movement of the finger or hand dangerously close to the point of action of the saw.

Other and further objects of the invention will be apparent to those skilled in the art from a reading of the complete specification and claims.

Referring to the drawing where my invention is illustrated,

Fig. 1 is a side view showing an outer guard and an inner guard in section for the purpose of clear illustration.

Fig. 2 is a view similar to Fig. 1 but showing the work being moved to a position where the saw can function.

Fig. 3 is a view similar to Figs. 1 and 2 but showing the operative's finger at the first dangerous position.

Fig. 4 is a view similar to Fig. 3 but with the cut of the saw almost complete and the operative's finger in a position to be arrested by the second projection of the inner guard.

Fig. 5 is a view taken on the line 5—5 of Fig. 1.

Fig. 6 is a view similar to Fig. 5 but showing a modified form of pivot means for the inner guard.

Fig. 7 is a view similar to Fig. 1 but of a modification.

Fig. 8 is a front view from the line 8—8 of Fig. 7.

Fig. 9 is a view similar to Fig. 7 but of a further modification.

Fig. 10 is a front view taken on the line 10—10 of Fig. 9.

Figs. 11 and 12 are side and front views respectively of a modification.

Figs. 13, 14 and 15 are side, front and top views, respectively of an adaptation to use with a band saw.

Figs. 16 and 17 are side and front views of the invention as adapted for use with a jig saw.

The same reference characters refer to the same or similar parts throughout the specification and drawing.

An important feature of this invention is the construction whereby a full view of the point of action of the saw is obtained while the fingers and other parts of the hand of the operative are fully protected. In the present illustration, the projections, which contact the fingers or other portions of the operative's hand, are supported from a suitable support or the outer guard usually found, in one form or another, as a guard for a saw.

The reference character 20 designates the saw table of a circular saw 21 which is used as an example in the drawing. The saw 21 is pivotally mounted to rotate on the shaft 22 and extends above the top surface of the table. The saw rotates counterclockwise as illustrated in Figs. 1 to 4.

The outer guard 23 is of a slightly different type than the usual guard in that it is wider to provide space for the inner guard to be presently described. The outer guard is suitably supported for movement in a vertical plane as is well known in the art. In order to carry out the purposes and objects of this invention, the front of the outer guard is open as at 23b to present a full view of the point of action where the saw is cutting the work. This is illustrated clearly in Figs. 6 and 7. The open end does not expose the hands of the operative to danger from the saw as will be later made clear. The work piece is illustrated at 28.

Secured in the sides of the outer guard 23 are the ends of a pivot rod 25 which pivotally supports the inner guard member 26. This inner guard 26 has a plurality of projections 26a, 26b. The projections 26a, 26b are preferably in a plane parallel to the plane of the saw and at a sufficient distance from the plane of the saw to provide a clear view of the point of action of the saw from the position of the operative. The second projection 26b is preferably unitary with the projection 26a and is so located that when the inner guard with its normal tendency to drop on the table 20, touches the table, the second projection 26b will be near the table 20 but not necessarily in contact therewith. And when the work 28 is being cut by the saw 21, the projection 26a will hold the projection 26b above and out of contact with the work 28, until the end of the work 28 clears the projection 26a.

From Fig. 5, it will be observed that there are two sets of projections 26a, 26b, one set in a plane at one side of the plane of the saw and the other set in another plane at the other side of the saw plane. In order to hold the two inner guard members 26 with their projections 26a, 26b in relatively fixed position, there are provided two spacer rods 26c which are located in positions which wil insure the unitary movement of both members 26 and at the same time not interfere with the operative's clear view of the point of cutting of the saw 21. Another consideration in the placing of the spacer rods 26c is the protective feature of the inner guard. If the inner guard members are desired to be placed a sufficient distance apart so that a space wide enough to permit entry of a finger results, then the spacer rods 26c may be placed so that when in a low position, they will prevent entry of a finger between the projections 26b, thus effectively protecting the fingers of the operative from coming into contact with the saw blade 21.

I will now describe the operation of the structure shown in Figs. 1 to 5, which has just been described.

With the saw in operation, the work 28, such as a board to be cut, is moved along the top of the table, its edge coming into contact with the inclined edges 23a of the outer guard 23. On contract with the inclined edges 23a, the outer guard 23 is lifted at its forward end, the work then coming into contact with the projection 26a as illustrated in Fig. 3. This raises the projection 26b to a position where its lower end will be above the level of the upper surface of the work. If desired, the type of outer guard which is adjusted to a proper height to just clear the work, may be used.

The work is now pushed forward until the saw comes into contact with and begins cutting the work as shown in Fig. 3. During this time until the end of the cut is approached, there is little danger of the fingers or other portions of the hand of the operative coming into contact with the saw. And during the cutting operation, it will be apparent that the point of action of the saw at the upper surface of the work is continuously in view of the operative, due to the divided construction of the inner guard members 26 and the open ended construction at 23b of the outer guard member 23.

It is near the end of the cutting operation that accidents are most liable to occur. For this reason, it is at this point that my invention is constructed to begin its main function. Referring to Fig. 3 where the end of the work passes the projection, the cross section of the operative's finger and its position have been indicated, as at 27. It will be noted that in addition to the fact that, as already pointed out, the operative is able to see the point of action of the saw, the projection 26a will contact the finger 27 and warn the operative of his dangerous approach to the saw. If, after the work has passed through and the end of the cut has been reached, the operative's hand should slip dangerously near to the saw blade, the projection 26b will have dropped in front of the cutting edge of the saw and the finger will come into contact with the inner side of the projection 26b and its approach to the saw definitely stopped. The positions of the parts in this situation are illustrated in Fig. 4.

If desired, the springs 23c may be provided to force the inner guard member downwardly. Referring particularly to Figs. 5 and 6 the inner guard members 26 are held in proper spaced relation to the adjacent sides of the outer guard 23 by small spacers 28a. In addition, there may be provided a spacing sleeve 29 through which the pivot rod 25 passes and which assists in holding the inner guard members in relative position. Assisting the spacing sleeve 29 are the spacer rods 26c, already described, which also provide a protection for the operative's hand.

Now referring to Fig. 6 where I have illustrated a slightly modified form, the parts shown are similar to those already described with the exception of the omission of the sleeve 29 and the replacement of the pivot rod 25 by two relatively short pivot rods or bolts 125. The heads 125a take on the function of the spacing sleeve 29 and the absence of the rod 25 extending across between the inner guards, gives the operative a clear view of the point of action of the saw, which, as already pointed out, is a very important feature of this invention.

In order to provide a means for supplementing the force of gravity tending to move the inner guards to their low positions on the table of the saw or the work, there may be provided a spring or springs 23c which may be attached at one end to the spring and at the other to the outer guard or other support.

The modification illustrated in Figs. 7 and 8 will now be described.

The parts 20, 21, 22, 23, 23a, 23b and 30 are the same as already described for the structure shown in Figs. 1 to 6. The modification illustrated in Figs. 7 and 8 relates to the inner guard itself. Instead of making the inner guard and its rigid parts of several units, I provide a bent wire structure 24 which is provided with integral pivot members 24a suitably pivoted as, for example, in the sides of the outer guard members 23. The sides of the inner guard member 24, extend downwardly and in the general direction of the saw but out of the plane of the saw in order to give the operative a full view of the point of action of the saw. At the points where the inner guard normally contacts the table of the saw or the work when in place, there are bends or loops 24b which correspond to and have the same function as the projections 26a already described. Rearward of the projections 24b, the wire body 24 is bent to form protecting loops 24c which are connected together by the connecting portion 24d. In this modification, as in the construction first described, the lower end of the loop nearest the saw is normally out of contact with the table or work and if the finger of the operative should approach the point of action of the saw, the finger will be protected by the lower ends of the loop 24c and the cross member 24d, against a too-close approach to the point of action of the saw.

It will be observed that the pivot members 24a which are journaled in the sides of the outer guard 23 can be made to remain in place by the resiliency of the inner guard 24 and that to remove the guard from its operative position, it is only necessary to spring in first one of the pivot portions 24a and then the other. The inner guard may then be removed.

The springs 31 are provided, if desired, to help the force of gravity to hold the inner guard in its low position and to move it to a position to intercept the movement of the hand of the operative in the guiding of the work. These springs are secured at one end to the upper portion of the loop 24 and at the other to the side of the outer guard or other support.

In the form of the invention illustrated in Figs. 9 and 10 the parts 20, 21, 22, 23, 23a, 23b and 31 are the same as the similarly designated parts already described. The inner guard member 124 with its projections 124a, bends or loops 124b, and protecting loops 124c is similar to the inner guard 24 with its projections 24a, bends or loops 24b and protecting loops 24c as already described and as shown in Figs. 7 and 8.

However, in the form of the invention shown in Figs. 9 and 10, the cross member connecting the ends of the loops 124c has an upward extending loop 124d which in some constructions where the side projections 124b and the loops 124c are at a greater distance apart, may give greater protection to the hand of the operative.

It is to be understood that the sizes and proportions of the guards would vary according to the class of work for which the guard or guards may be supplied; as for example, for the thickness of wood or other material to be worked. The guards may be made of metal, plastics or of any suitable material or materials.

The modification illustrated in Figs. 11 and 12 will now be described.

The table 20 rotatably supports the shaft 22 upon which is mounted the saw 21 as has already been described. The support for the guard member in the present modification differs from the constructions already described. There is also a modification of the guard itself.

Instead of being supported by the outer guard, the guard member 224 is provided with a supporting means 250 which may in turn, be supported from the frame of the room in which the saw is installed or in any desired manner. In this case, the outer guard already described, may, if desired, be omitted.

The supporting means is provided with suitable openings 250a in its lower end through which the ends of the guard member 224 are inserted. The guard member 224 is provided with two pivot portions 224a which contact with the openings and act as pivots about which the guard member 224 swings. One of the pivot members 224a is provided with an extension 224e for the purpose of applying a spring 231 which is attached at one end to the outer end of the extension 224e and has its other end secured to the supporting means 250 as shown in Fig. 11.

The main part of the guard 224, with its parts 224a, 224b, 224c and 224d perform in a manner similar to the performance of the guard 24 and its corresponding portions 24a, 24b, 24c and 24d, already described. The work 228 is illustrated in a position to raise the guard 224 by its projection 224b when the work 228 is moved toward the saw blade 21.

The support 250 may and preferably is adjustable to any desired height but since height adjusting means are old and well known in the art and form no part of the instant invention per se, no further description of this construction is thought to be necessary.

In the adjusted position shown in Fig. 11 it will be observed that the outer end 224d of the loop 224c of the guard 224 is in contact with the table 20, in a manner described for the operation of the guard 24 as illustrated in Figs. 2 and 4.

In Figs. 13, 14 and 15, is illustrated a form of the invention as applied to the protection of an operative of a band saw. The saw table 120 is provided with an opening 120a through which the saw blade 121 passes. Adjustably supported above the table 120 is a saw guide block 150 having a saw guide slot 150d. This block 150 is supported at the low end of the adjustable support 150a which may be supported from above and adjustable in any of the ways which are well known in the art.

The guard block 150 carries a suitable guard supporting means as the U-shaped member 150b which is secured in place as by the screws 150c. At the inner end of the U-shaped member 150c, there are provided openings 150e in which the ends 24a of the guard 24 are inserted. The guard 24 shown in Figs. 13, 14 and 15 is similar in construction to that of Figs. 7, 8, 9 and 10 and the operations of the portions 24a, 24b, 24c and 24d are the same in both constructions. The spring 231 is somewhat similar in construction to the spring 31 of Fig. 7 and has one end connected to the top of the loop 24c. Its other end is shown connected to the lower edge of the block 150. It is to be noted that the adjustment of support 150a as shown in Figs. 13 and 14 is such that the end of the loop 24c farthest from the operative is in contact with the saw table and the projection 24b is above the saw table.

It will be noted from Figs. 12, 14, and 15 that while the operative's hand is protected, there is a clear view of the point of action of the saw to enable the operative to be sure that a proper cut is being made.

In Figs. 16 and 17 is illustrated an application of the invention to a jig-saw. In these Figs. 16 and 17 the upper arm 240 carries the upper end of the saw 221 and the lower or driving arm 241 carries the lower end of the saw 221. The driving arm 241 is provided with a crank drive which I have designated generally by the reference character 242 which is well known in the art as to both its construction and operation. The V-type pulley 243 drives the crank drive 242 in a well known manner.

In this adaptation of the invention, the guard 224 with its parts 224a, 224b, 224c and 224d and the spring 231 are similar in construction and operation to the similarly constructed guard 224, with its parts 224a, 224b, 224c and 224d and the spring 231 already described in connection with the illustration of Figs. 11 and 12. The support 250 of Figs. 16 and 17 is similar in construction to that of Figs. 11 and 12 with the addition of a pad 244 at each side which may be adjusted through the support 250 so that its under side will be just above the upper surface of the work 228 so that the work will be held on the table to insure a proper cut. As shown here, the cross portion 224d of the guard 224 is in contact with the saw table 220 while the projection 224b is slightly thereabove.

In this adaptation as well as the others described, it will be clear that the operative will have a clear view of the point of action of the saw while the hand of the operative will be protected from injury.

While this invention has been illustrated and described in detail, it is to be understood that the disclosure is merely illustrative and that modifications and changes in construction, materials, shapes and sizes of the parts and of the structure as a whole may be made without departing from the spirit of the invention and within its scope as claimed.

Having described my invention, what I claim is:

1. A protective guard means for a saw comprising an outer guard for resting on the top surface of the work being cut, the outer guard having side portions at the sides of, but out of the line of the operator's vision toward the point of saw action and having an open end toward the operator, a bifurcated inner guard means between the operator and the place of cutting of the saw, the inner guard means having its bifurcated members on opposite sides of the saw plane and comprising a portion on each bifurcated member movable to a position in the path of the hand of the operator and out of the plane of the saw to leave an unobstructed operator's view of the point of action of the saw on the work and a second portion on each bifurcated member and spaced from the first portion a distance, at least, equal to the space occupied by the operator's finger, and in position to form a finger-stop short of the cutting edge of the saw.

2. A protective guard means for a saw comprising an outer guard for resting on the top surface of the work being cut, the outer guard having side portions at the sides of, but out of the line of the operator's vision toward the point of saw action and an open end toward the operator, a bifurcated inner guard means pivotally supported from the sides of the outer guard and movable with relation thereto, the inner guard means having a plurality of contacting means for the hand of the operator when the hand approaches the saw blade and spaced apart sufficiently to receive an operator's finger, the contacting means being out of the plane of the saw to permit of an unobstructed operator's view of the point of action of the saw, the contacting means nearest the saw being in the form of a finger-stop.

3. A protective guard means for a saw comprising a support, a movable outer guard movably mounted thereon at the side of the saw position and outwardly of and away from the operator's clear view of the point of saw action, a plurality of work engaging projections pivotally supported on the outer guard and substantially in a line from the operator's eye to the point of action of the saw but out of the plane of the saw, the projections being in position and mounted for simultaneous upward movement to offer resistance to the movement of the operator's hand toward the point of action of the saw the projections being spaced apart a sufficient distance to receive the finger of the operator, one of the projections forming a finger-stop adjacent the saw.

4. A protective guard means for a saw comprising a support, a movable outer guard mounted thereon, a plurality of work engaging projections pivotally supported on the outer guard and movable substantially in a plane parallel to but out of the plane of the saw, a second plurality of work engaging projections spaced from the first mentioned set of projections a distance apart greater than the width of an operator's finger and out of the plane of the saw, means for connecting the projections to cause them to move as a unit, the projections being so placed out of the saw plane as to leave a clear view from the eye of the operator to the point of action of the saw and in positions to arrest the hand of the operator if brought dangerously near to the saw.

5. An outer saw-covering guard hood, an inner finger-stopping guard comprising a rigid member to engage and be raised by the work piece and pivoted to and supported from and within said outer hood, the pivot being above the work and at the end of the hood toward the operator, the end of the hood toward the operator being open and the sides being laterally spaced from the plane of the saw and the parts of the inner guard engaging the work being normally below and toward the saw from said pivot and out of the plane of the saw to give the operator an unobstructed view of the point of action of the saw, said inner guard having two downwardly projecting portions on the side of the pivot toward the saw, a beveled-face portion to be engaged and raised by the work as the work passes under and just beyond the pivot and a finger-stopping portion beyond said beveled-face portion and at a right angle to a radius from the pivot to drop behind the work after said work has passed it and to stop positively the operator's finger from further motion toward the saw.

CHRISTIAN C. PETERSEN.

References Cited in the file of this patent

UNITED STATES PATENTS

| Number | Name | Date |
|---|---|---|
| 997,720 | Troupenat | July 11, 1911 |
| 1,594,772 | Fournier | Aug. 3, 1926 |
| 2,010,851 | Drummond | Aug. 13, 1935 |

FOREIGN PATENTS

| Number | Country | Date |
|---|---|---|
| 26,400 | Germany | Mar. 26, 1884 |
| 153,002 | Austria | Apr. 11, 1938 |
| 385,083 | Germany | Nov. 16, 1923 |